Sept. 10, 1929.  D. TAYLOR  1,727,572
COTTON SEED DELINTING MACHINE
Filed May 15, 1929   3 Sheets-Sheet 1
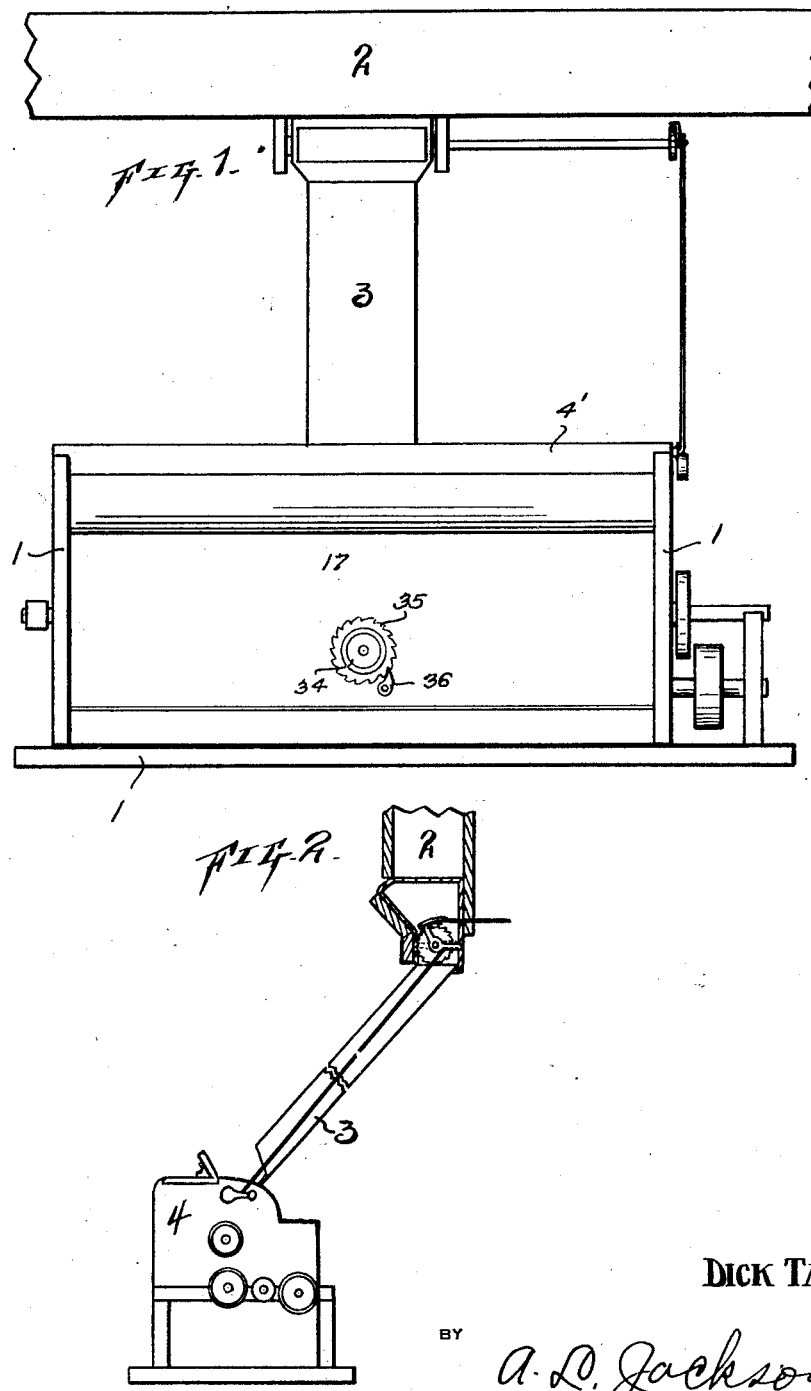
INVENTOR
DICK TAYLOR
BY
A. D. Jackson
ATTORNEY Sept. 10, 1929.  D. TAYLOR  1,727,572
COTTON SEED DELINTING MACHINE
Filed May 15, 1929   3 Sheets-Sheet 2
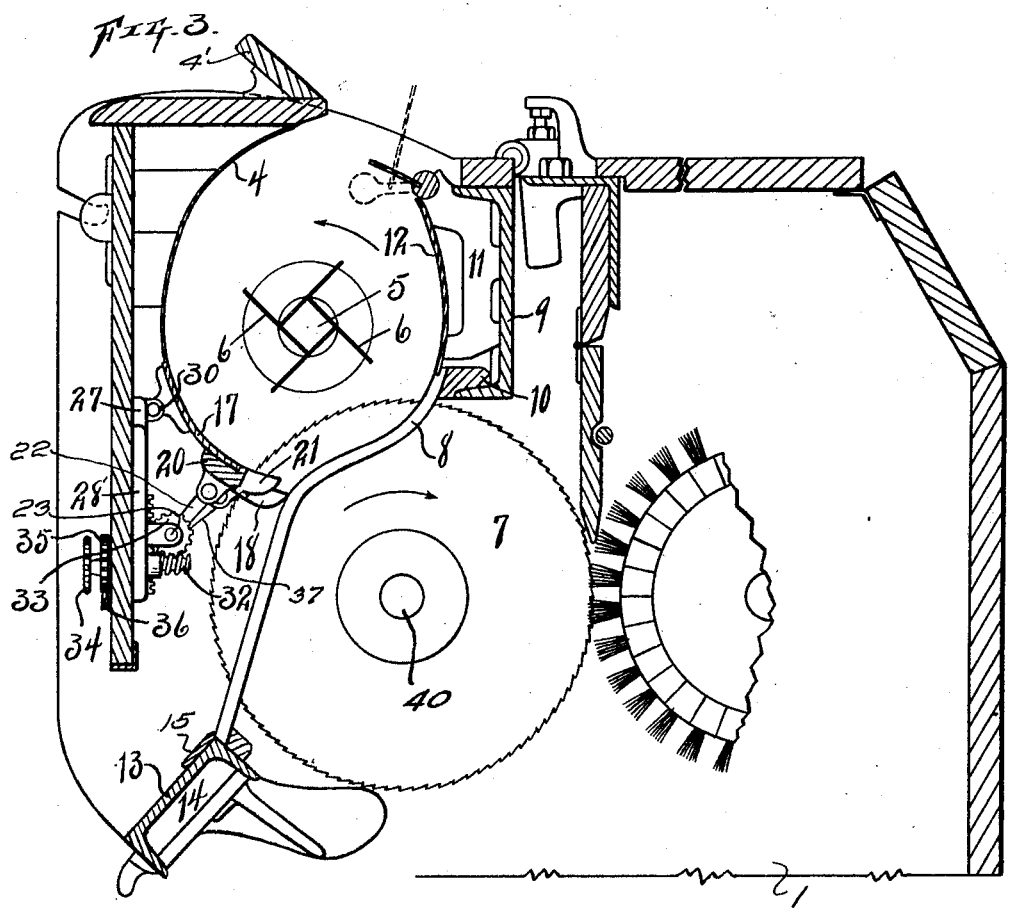
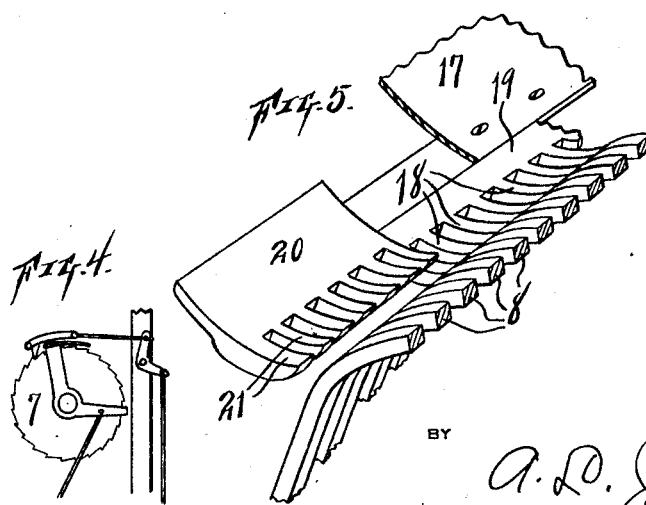
INVENTOR
DICK TAYLOR
BY
A. D. Jackson
ATTORNEY

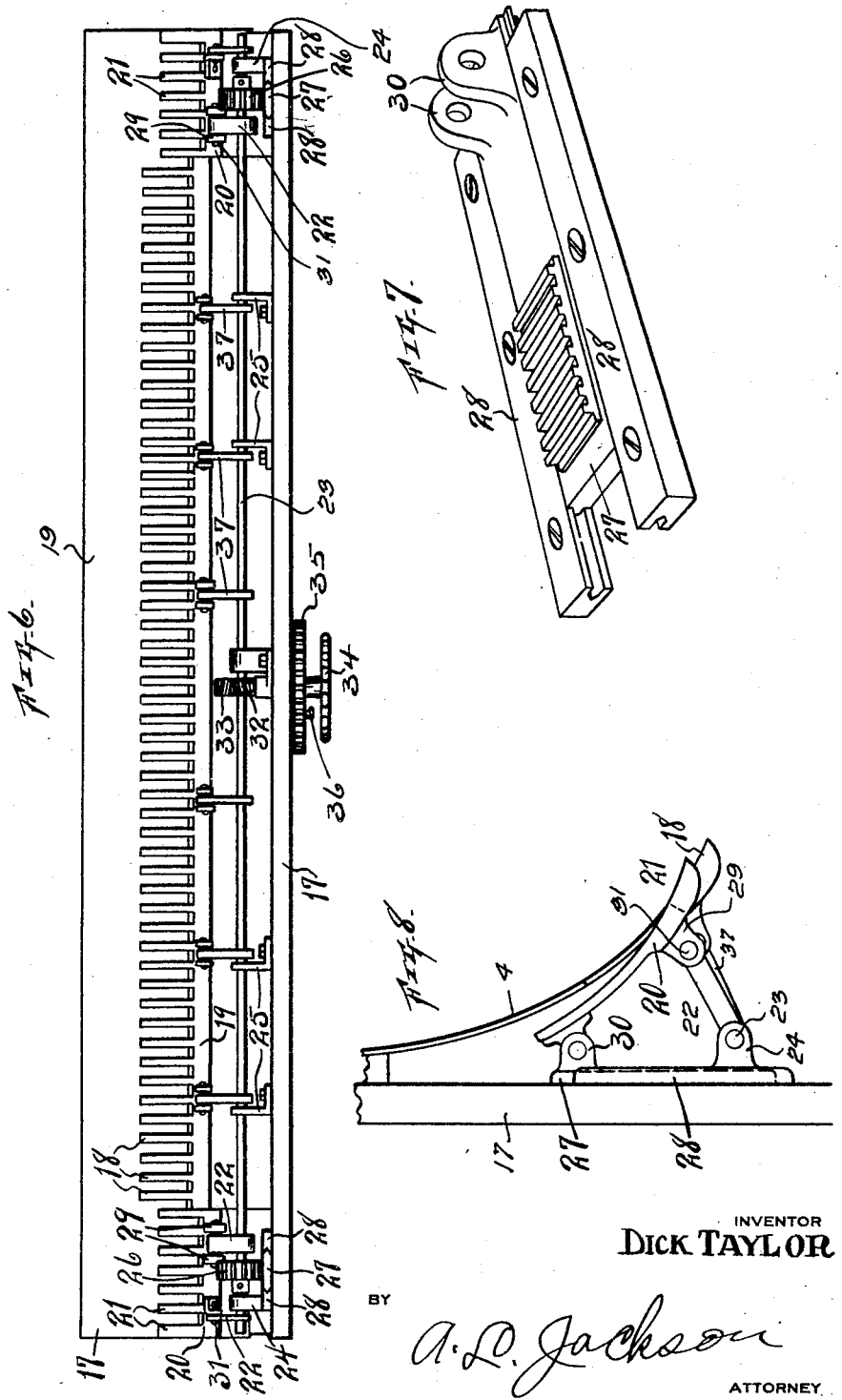

Patented Sept. 10, 1929.

1,727,572

UNITED STATES PATENT OFFICE.

DICK TAYLOR, OF PARIS, TEXAS.

COTTONSEED-DELINTING MACHINE.

Application filed May 15, 1929. Serial No. 363,305.

My invention relates to cotton seed delinting machines and more particularly to improvements in the feeding of seed to the machine and also in the discharge of seed from the machine and also to means for increasing the output of delinting machines; and the object is to provide delinting machines with an increased number of saws and ribs and to adapt the cooperating parts to the increased number of machines and to provide a new method of discharging the seed from the machine and another advantage is incidentally obtained in maintaining a loose roll in the roll box so that the saws will run through the seed without creating so much friction and an advantage is also obtained in the fact that the power to run the saws will be materially reduced or the saws will run much faster by reason of the decrease of the friction. One advantage of feeding the seed to the saws in the central part of a gang of saws is that the lint is stripped much cleaner from the seed due to the repeated treatment of the seed while the seed are gradually worked towards the ends of the gang of saws to be discharged from the saws, fewer seed going down between the saws than in the old style of saws. Other objects and advantages will be fully explained in the following description and the invention will be more particularly pointed out in the claims.

Reference is had to the accompanying drawings which form a part of this application.

Fig. 1 is a front elevation of delinting machine.

Fig. 2 is a detail view of the feed chute, being a broken side elevation of the same.

Fig. 3 is a side elevation of the working parts of delinting machine.

Fig. 4 is a detail view of the means for starting the seed down the feed chute.

Fig. 5 is a perspective view of a part of the rake head, showing the adjustable sections at the ends thereof.

Fig. 6 is an inverted plan view of the improved gin breast, showing the manner of adjusting the movable end sections.

Fig. 7 is a perspective view of the section adjusting devices.

Fig. 8 is an enlarged detail view of the rake adjusting means.

Similar characters of reference are used to indicate the same parts throughout the several views.

This machine is provided with a frame 1 of ordinary type and need not be described in detail and is shown only in conventional form. The machine is provided with a conveyor box 2 of the usual type for distributing seed to a battery of gin stands. The feed chute is not like the old feed chutes, but the machine has a relatively narrow feed chute 3 which feeds seed to the middle portion or portion intermediate the ends of the roll box 4. A revolving roll former 5 is journaled in the roll box 4 and provided with wings 6 in the usual manner. The saws 7 are provided with a shaft 40 which is journaled in the frame 1 and are relatively thin and run between ribs 8 and through that portion of the roll of seed which is next to the ribs, removing the lint from the seed, and the lint is taken from the saws by an ordinary brush.

The ribs 8 are preferably square in cross-section and made in this manner for strength and compactness so that there may be an increased number of saws 7 and particularly so that saws may be closer together than in gins of the prior art. So far as I know the greatest number of saws in the prior art are 106. I have demonstrated thoroughly that I can use 140 saws and not require any more space than 106 saws formerly by making the ribs in the manner above set forth. The principal advantage in using this increased number of saws is the increased production, increasing the production approximately 30% with the same amount of floor space. The reason for this is that the saws are closer together and the seed roll is more easily formed and not packed so hard and the saws run through the seed roll with less friction and less power is required to run the machines or saws.

The ribs 8 are attached to the top rib rail 9 which is provided with metal fillers 10 and 11. A portion of the roll box member 12 laps on the upper ends of the ribs 8. The ribs 8 are attached to the lower rib rail 13 which is provided with a metal filler 14. A flat bar 15 is attached to the lower rib rail 13 and clamps the ends of the ribs 8 thereto.

The seed are fed into the roll box from the chute 3 and are forced towards the ends of the roll box by gravity of the seed coming down through the chute 3. The seed are forced along in the roll box towards each end and escape under the sections 20, as the only avenues of escape. The seed are prevented from falling out of the roll box by the rake which is an improved construction. The rake includes a central member 19 which is fixedly attached to the seed board 17. The teeth 18 are attached to the seed board 17 rigidly. The teeth 18 are cast on a bar 19 which is riveted to the seed board 17. Two other sections 20 are adjustably connected to the seed board 17 by means of link bars 22 which are pivotally connected to a bar 23. The bar 23 is journaled in the lugs 24. The sections 20 are swung to different positions by pinions 26 which engage racks 27. The racks 27 are slidably mounted in brackets 28 which are attached to the seed board 17. The racks 27 have ears 30 by which the sections 20 are pivotally connected to the lugs 29 by pins 31. The lugs 29 are formed on the sections 20. The lugs 24 and 25 are attached to the seed board 17. The teeth of rake member 19 rest on the ribs 8 so that seed will not fall as usual along the entire front of the machine but will be forced by gravity towards the ends of the rake and escape under the sections 20 past the teeth 21. The sections 20 are swung closer to or further from the ribs 8 by revolving the pinions 26 which are rigid with the shaft 23. The shaft 23 is revolved by worm gearing which consist of worm 32 and pinion 33. The worm 32 is manually operated by a hand wheel 34. The hand wheel 34, after adjusting the sections 20, is held at the required adjustment by a ratchet 35 and a pin 36. Links 37 support the outer edge of the member 19 and are not adjustable.

Figure 1 of the drawings shows in conventional form a delinting machine. The cotton seed are moved along in a conveyer trough 2 and as they come to a chute 3 the seed are fed through the chute 3 into a hopper 4'. This machine as shown is just one of a battery of delinting machines. The seed are formed into a roll in the roll box 4 by means of action of the saws of the gin and also by the winged roller 5. The saws strip the lint from the seed and instead of the seed falling down as usual along the entire length of the seed board 17, the seed are forced towards each end of the gang of saws by the pressure of seed which are constantly fed down the chute 3. The seed are thus subjected repeatedly to the action of the saws and cannot escap from the machine until they come to the sections 20 of the rake. The sections 20 may be spaced further from or closer to the ribs 8 to provide passage for the seed after the lint is stripped therefrom.

What I claim is:

1. A cotton seed delinting machine having a frame and a saw shaft journaled in said frame, a plurality of ribs attached to said frame, saws rigid with said shaft and projecting between said ribs, and a rake having a central section provided with teeth resting on said ribs, and adjustable end sections having teeth spaced from said ribs.

2. A cotton seed delinting machine having a frame and a saw shaft journaled in said frame, a plurality of ribs attached to said frame, saws rigid with said shaft and projecting between said ribs, and a rake having a central section provided with teeth resting on said ribs, adjustable end sections having teeth spaced from said ribs, and means for adjusting said adjustable sections relative to said ribs.

3. A cotton seed delinting machine having a frame and a saw shaft journaled in said frame, a plurality of ribs attached to said frame, saws rigid with said shaft and projecting between said ribs, and a rake having a central section provided with teeth resting on said ribs, adjustable end sections having teeth spaced from said ribs, means for adjusting said adjustable sections relative to said ribs, consisting of a pivot shaft, link bars pivotally connected to said shaft and pivotally connected at the other end to said adjustable sections, and slidable racks pivotally connected to said sections, and means for moving said racks.

4. A cotton seed delinting machine having a frame and a saw shaft journaled in said frame, a plurality of ribs attached to said frame, saws rigid with said shaft and projecting between said ribs, and a rake having a central section provided with teeth resting on said ribs, adjustable end sections having teeth spaced from said ribs, means for adjusting said adjustable sections relative to said ribs, consisting of a pivot shaft, fixed bearings for said shaft, slidable racks pivotally connected to said sections, link bars pivotally connected to said shaft and to said adjustable sections, and gearing for actuating said racks from said shaft.

5. A cotton seed delinting machine having a frame, a gang of saws provided with a shaft journaled in said frame, a seed board, a plurality of ribs attached to said seed board and extended between said saws, a rake composed of a relatively long central member rigid with said seed board and provided with teeth resting on said ribs and relatively short adjustable sections pivotally connected to said seed board and having teeth spaced from said ribs, a shaft and bearings for said shaft rigid with said seed board, link bars pivotally connected to said shaft and pivotally connected to said adjustable sections, slidable racks pivotally connected to said sections, and gearing operatively connected with said shaft and with said racks for adjusting said adjustable sections.

6. In a cotton seed delinting machine provided with a gang of saws; a relatively narrow chute for feeding seed to the central portion of said saws, ribs extended between said saws and means for forcing seed from said central portion of said saws past the saws to both ends of the gang of saws consisting of said chute forcing the seed in both directions by gravity of seed fed constantly through said chute, a rake having a relatively long central member provided with teeth resting on said ribs, and relatively short end sections having teeth spaced from said ribs for escape of seed.

7. In a cotton seed delinting machine provided with a gang of saws; a relatively narrow chute for feeding seed to the central portion of said saws, ribs extended between said saws and means for forcing seed from said central portion of said saws past the saws to both ends of the gang of saws consisting of said chute feeding seed in both directions by force of gravity of seed fed constantly through said chute, a rake having a relatively long central member provided with teeth resting on said ribs, relatively short end sections having teeth spaced from said ribs for escape of seed, and means for adjusting said adjustable end sections for controlling the passage of seed therefrom.

In testimony whereof, I set my hand, this 7th day of May, 1929.

DICK TAYLOR.